United States Patent [19]

Essig et al.

[11] Patent Number: 5,428,207
[45] Date of Patent: Jun. 27, 1995

[54] INDUCTIVE BASED COOKING SYSTEM

[75] Inventors: Willi Essig, Boeblingen; Franz Bogdanski, Oberderdingen; Guenter Fettig, Karlsruhe-Groetzingen; Juergen Horn, Kraichtal, all of Germany

[73] Assignee: E.G.O. Elecktro-Gerate Blanc u. Fischer, Germany

[21] Appl. No.: 30,856

[22] Filed: Mar. 12, 1993

[30] Foreign Application Priority Data

Mar. 14, 1992 [DE] Germany .......................... 42 08 253.6
Jul. 24, 1992 [DE] Germany .......................... 42 24 405.6

[51] Int. Cl.⁶ ............................................. H05B 6/12
[52] U.S. Cl. ................................... 219/622; 219/623; 219/627; 219/677
[58] Field of Search ............... 219/622, 623, 624, 627, 219/667, 662, 632, 676, 677

[56] References Cited

U.S. PATENT DOCUMENTS

| | | | |
|---|---|---|---|
| 3,719,789 | 3/1973 | Harnden, Jr. | 219/627 |
| 3,814,888 | 6/1974 | Bowers et al. | |
| 3,989,916 | 11/1976 | Amagami et al. | 219/622 |
| 4,092,511 | 5/1978 | Austin . | |
| 4,303,816 | 12/1981 | Goessler et al. | 219/627 |
| 4,348,571 | 9/1982 | Dills | 219/622 |
| 4,453,067 | 6/1984 | Karklys et al. | 219/624 |
| 4,467,162 | 8/1984 | Kondo et al. | 219/624 |
| 4,551,600 | 11/1985 | Miyagawa et al. . | |
| 4,629,843 | 12/1986 | Kato et al. . | |
| 4,910,372 | 3/1990 | Vukich | 219/622 |

FOREIGN PATENT DOCUMENTS

| | | | |
|---|---|---|---|
| 2306037 | 8/1974 | Germany . | |
| 1-105489 | 4/1989 | Japan | 219/623 |
| 3-214589 | 9/1991 | Japan | 219/623 |
| 3-289084 | 12/1991 | Japan | 219/622 |

OTHER PUBLICATIONS

Peters, P. H.: A portalble cool-surface induction cooking appliance. In: IEEE Transactions on Industry Applications, vol. IA-10, No. 6, Nov./Dec. 1974, S.814-822.

Primary Examiner—Philip H. Leung
Attorney, Agent, or Firm—Quarles & Brady

[57] ABSTRACT

An induction based point heating system for cooking utensils or the like contains induction coils positioned below a plate, e.g. a glass ceramic plate. It is constructed as a cohesive component and includes induction generating means and the associated power, frequency generation or control electronics for the induction coils. The component is in the form of a flat plate or tray, which can be pressed from below against the plate. The induction coil is constructed as a flat, disk-like coil, which on its side remote from the plate is adjacent to a magnetic yoke such as a preferably segmented ferrite layer.

22 Claims, 7 Drawing Sheets

FIG.8a
$P_1 \cong$ "✳"

FIG.8b
$P_{2/3} \cong$ "X"

FIG.8c
$P_{1/3} \cong$ "Y"

FIG.8d
$P_0 \cong$ "O"

INDUCTIVE BASED COOKING SYSTEM

BACKGROUND OF THE INVENTION

The invention relates to an induction based cooking system for cooking vessels or the like.

Induction heating systems have the advantage of very low-inertia heat generation directly in the cooking vessel, namely in the base of the cooking pot. The actual cooking appliance remains largely cold. The disadvantage is the relatively high construction expenditure and the control problems. As electronic compounds are required for the necessary high frequency production and the control thereof and as the dissipated heat in the electronics and the induction coil there is greater heating of the induction generating means, it has been necessary to place the conversion and control electronics separately from the cooking cooker. Thus, installation in normal cookers or hobs was impeded and therefore induction cookers were generally installed in special equipment.

OBJECTS OF THE INVENTION

A primary object of the invention is to provide an easily handleable and installable induction based cooking system, which is ready for connection.

SUMMARY OF THE INVENTION

The invention provides a component apart from the induction generating means, which is usually in the form of induction coils, also contains the entire power and control electronics, including the frequency generating means. Externally there is only a need for a setting member, which can also contain a control microcomputer or other, preferably programmable control electronics. It is important that this unit can be positioned, in place of another cooker system, e.g. a radiant heating unit, below the glass ceramic plate of a hob or cooker and can be pressed in the same way as such a unit by means of springs or the like from below and onto the plate. Thermal insulation preferably positioned between the induction coil and the glass ceramic plate prevents a thermal reaction of the cooking utensils on the induction generating means and simultaneously acts as a mechanical buffer and electrical insulation.

If such a component preferably contains several and in particular two induction cookers, then the control and power electronics can be substantially common to both. Only the actual high frequency generating means, i.e. the power resonant circuit, would then have to be individually provided for each induction cooker.

Since, despite all optimization measures, both the induction generating means and the power electronics generate heat, and the electronics, so as to permit the use of commercially available components, must be protected against high temperatures, it is advantageous to place the induction generating means on a cooling body, which is provided on its underside with cooling ribs and corresponding cooling channels, through which a fan blows cooling air. In particular the power electronics can be in direct contact with the cooling body, whereas the remaining electronics can be located on a mounting plate terminating the cooling channels at the bottom and in the vicinity of the cooling air flow.

In an advantageous embodiment the fan is located in a recess of the cooling body and comprises a radial fan drawing air from below and which is so eccentrically positioned in the recess that in the case of the simplest construction there is an increasing cross-section of the area surrounding the fan wheel in the flow direction. Thus, even in the case of a circular recess, this leads to the effect of a helical fan casing, from which the air can flow directly into adjacent cooling channels. The arrangement is such that one of the laterally positioned cooling ribs is more particularly subject to the cooling air action. On the same are provided in an outer area parallel to the cooling body the control elements and they are directly flanged to said outer rib. This leads to an undisturbed cooling air flow in the cooling channels, which are free from components, whereas the heat transfer of the mainly heat generating power control elements takes place by means of the heat conduction of the cooling body (indirect cooling). Therefore the components are free from dirt exposure as a result of the air flowing round them.

However, it can also be appropriate to ventilate said "electronic channel". For this purpose, openings can be provided in the lateral outer rib. This construction is very shallow and has a limited installation height. Particularly since the radial fan requires no conducting devices, it is a simple component integratable into the unit. Fundamentally, temperature monitoring is not required in an induction cooker, because the heat is only formed outside the latter, namely in the cooking vessel. However, from the latter heat can be transferred to the plate and therefore inadmissibly overheat the glass ceramic plate. It is difficult to sense said plate using conventional means. Thus, according to the invention, a novel optical measuring device is used for measuring the plate temperature. It contains an infrared sensor, e.g. a silicon photodiode, which carries out a temperature measurement utilizing Planck's radiation law. With increasing glass ceramic plate temperature there is also a rise in the maximum of the frequency of the irradiated photons (Wien's displacement law). From a given temperature, the energy of the irradiated photons corresponds to the spectral sensitivity of the sensor, so that an evaluatable signal is obtained, which is used for switching off or reducing the power of the heating system.

As such an overheating of the glass ceramic plate can only occur if the heating system is incorrectly used, e.g. by depositing an empty pot, the temperature limiting means must fulfill a barrier function, i.e. the cooker must remain switched off when the temperature limiting circuit responds until it is manually disconnected and then reconnected again. This can easily be brought about by the control electronics, e.g. a microcomputer.

These and other features of the invention can be gathered from the claims, description and drawings, the individual features being realizable in an embodiment of the invention and in other fields, either singly or in the form of subcombinations, and can represent advantageous, independently protectable constructions for which protection is hereby claimed.

DESCRIPTION OF THE DRAWINGS

Embodiments of the invention are described in greater detail hereinafter relative to the drawings, wherein show.

Component

Figure 1:
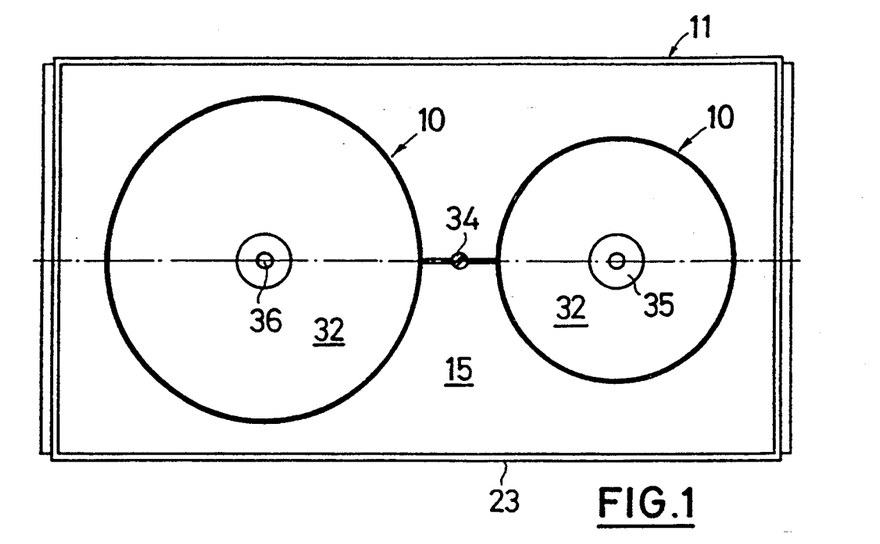
FIG. 1 A plan view of an induction based cooking system component.
Figures 2, 3:
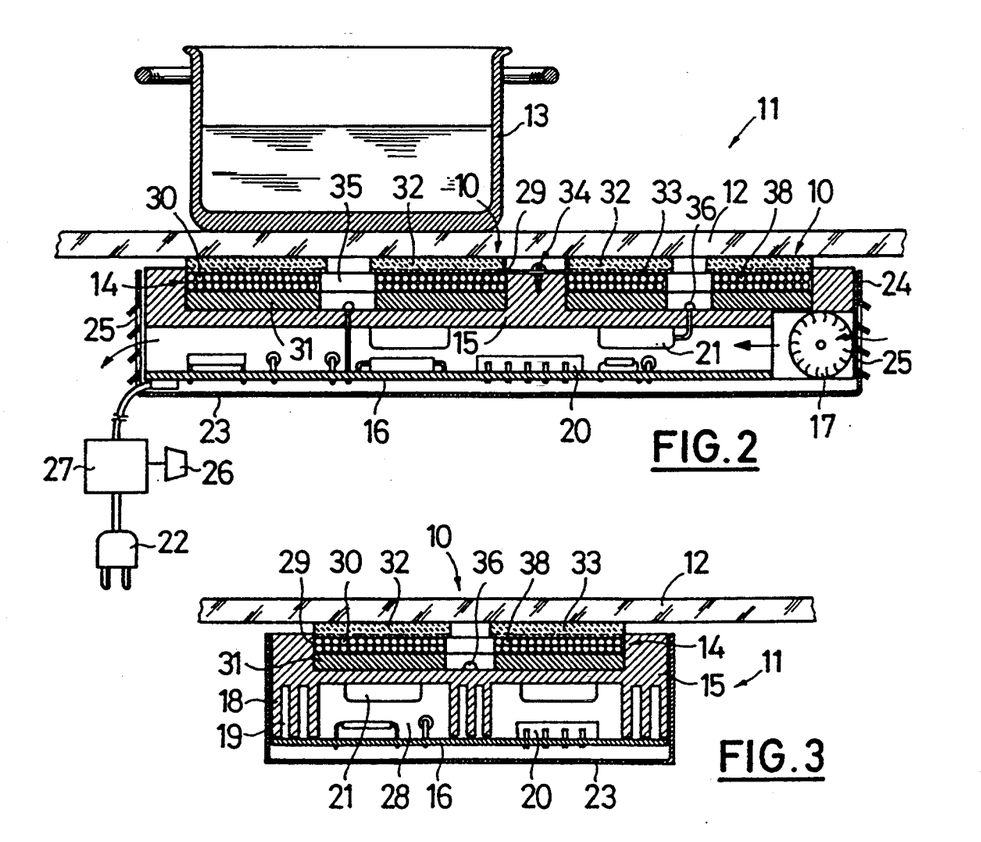
FIG. 2 A diagrammatic longitudinal section through the component.
FIG. 3 A cross-section of a heating system component of the invention.

FIGS. 1 to 3 show a component 11 for two induction cookers 10. It is provided for placing under a plate 12, e.g. a glass ceramic plate. The component forms a compact, relatively flat, easily handlable constructional unit which, with the exception of the power supply and a setting and regulating member 27 with knob 26, which can also incorporate a power control device, contains all the elements necessary for operation. The component can e.g. be pressed from below against the plate 12 by not shown spring elements. Through this arrangement and the inclusion of all the essential components the induction heating system can also be placed instead of and in addition to conventional radiant cookers in a glass ceramic cooking zone.

In a sheet metal tray 23 the component contains a cooling body 15, preferably a shaped aluminum part with a surface substantially closed at the top and cooling ribs 18 on the bottom, which form cooling channels 19 between them and run roughly along an axis 9 connecting the two cookers 10. On the top, the cooling body has recesses 29 in which are located induction generating means 14 and which are in each case associated with a cooker 10. On the underside of the cooling body is provided a mounting plate 16, which is, for example screwed to the outer cooling ribs, so that the cooling channels 19 and further larger areas 28 serving as cooling channels on the underside of the cooling body 15 are enclosed. Electronic power control elements 21, preferably in heat conducting connection with the cooling body 15, are located therein. The mounting plate also carries electronic components, but mainly the elements used for control purposes and therefore working with relatively small currents and limited heating. Everything fits into a sheet metal tray. However, the mounting plate could itself form the lower cover. In the vicinity of a short marginal side 24 of the elongated, rectangular component 11 ventilation openings 25 are provided through which a fan 17 arranged in a recess of the cooling body 15 draws air or blows it out after flowing through the cooling channels 19, 28. It is also possible to have a fan arranged centrally on the cooling body with an air outlet to two or more sides. Therefore the power control elements and the control electronics are directly cooled by the cooling air flow and the power control elements also give off their heat by conduction to the air-cooled cooling body.

Figure 13:
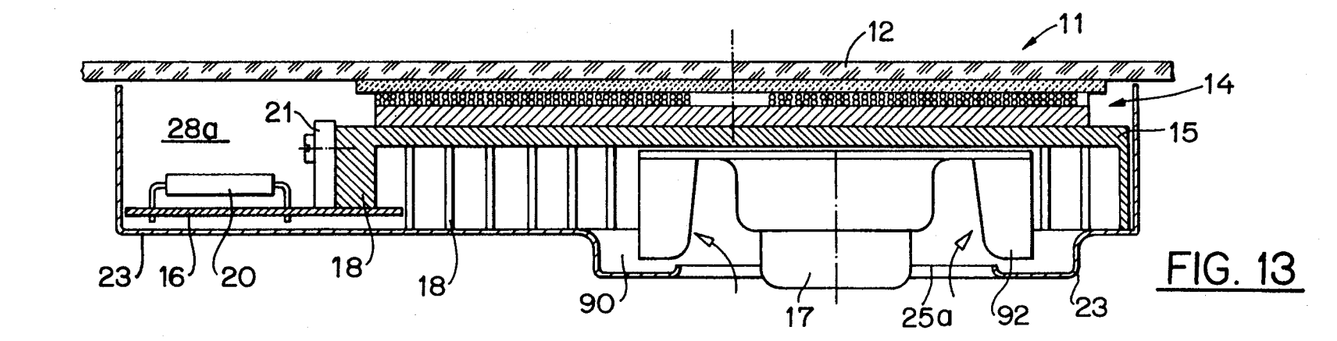
FIG. 13 A cross section through another preferred embodiment.
Figure 14:
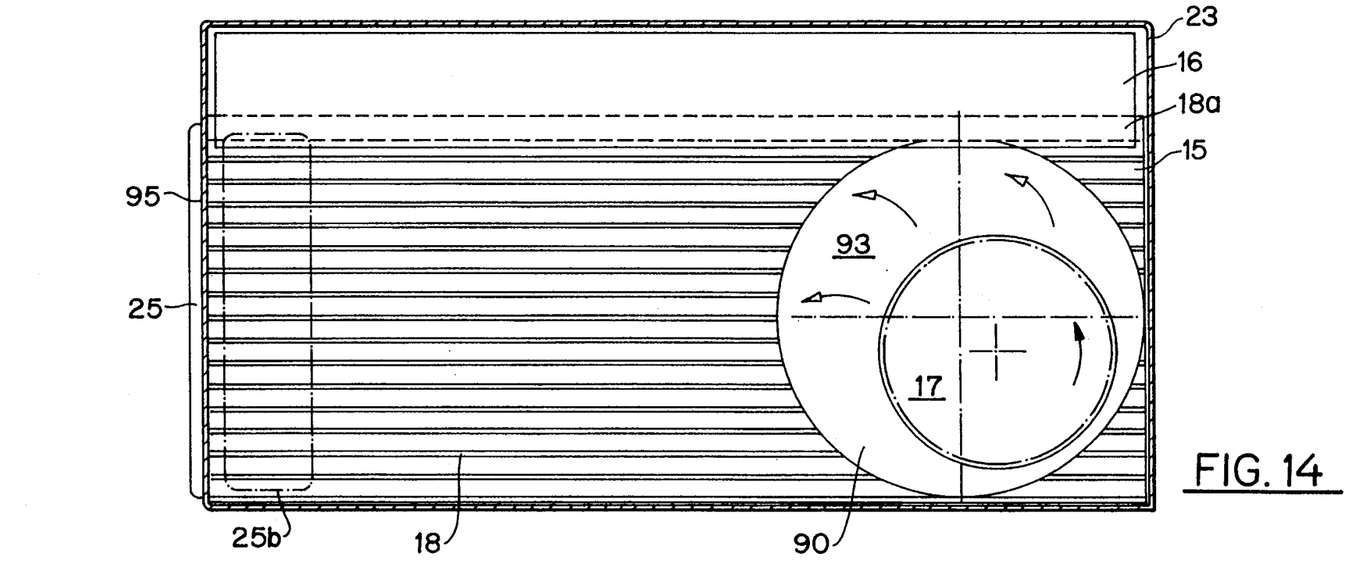
FIG. 14 A view from below of a cooling body.
Figure 15:
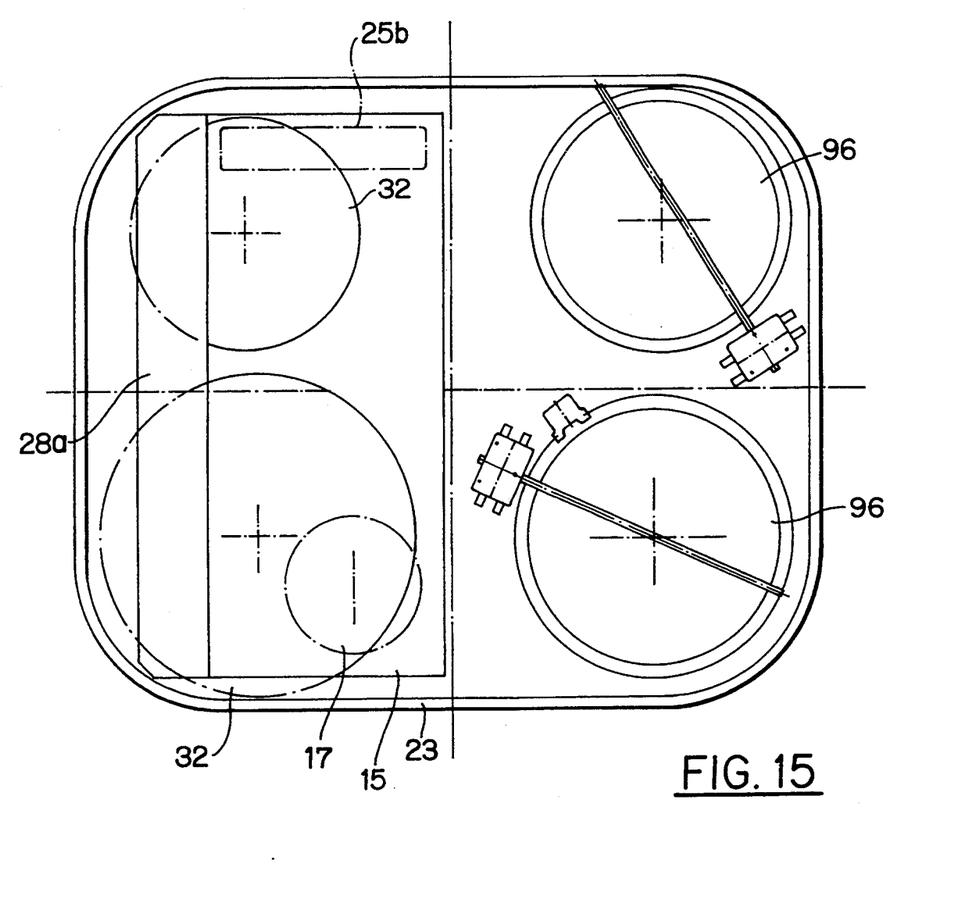
FIG. 15 A diagrammatic representation of a component with two inductive and two radiant heating elements.

FIGS. 13 to 15 show a detailed variant of a component corresponding with that described relative to FIGS. 1 to 3, except for the differences described hereinafter.

The cooling body 15 is a plate, whose top surface is flat and carries on it the induction generating means 14, which will be described hereinafter. Cooling ribs 18 are uniformly spaced over the underside. The outer cooling rib 18 is particularly thick on one side. The cooling body can be an extruded aluminum profile. On the underside, the cooling body has a circular recess which is cut to such an extent that in its vicinity the cooling ribs 18 are removed. It extends between the outer cooling ribs of the cooling body.

Eccentrically to said recess and displaced both with respect to the longitudinal axis of the cooling body and with respect to the central axis of the recess 90 at right angles thereto, is provided a radial fan. It can e.g. be flanged to the underside of the through upper plate 15a of the cooling body. It is a conventional external rotor-type radial fan 17, whose rotating external rotor carries a fan wheel with radial fan blades 92. In the lower cover 23 a central suction opening 25a is constructed centrally to the fan and through which the latter exerts a suction action from below and feeds the air with a certain angular momentum in the rotation direction (cf. FIG. 14) into the area 93 formed between the outer boundary of the recess 90 and the fan wheel. As a result of the eccentric displacement, this area has a different width and consequently different cross-section. The cross-section is largest in the direction away from the fan and sloping towards the reinforced outer rib 18a. Therefore said area forms a guiding means in the manner of a fan volute or a worm casing, such as used in the case of radial fans, but is much easier to manufacture. It ensures a good air distribution with a certain preference for the side facing the outer rib 18a. The air is calm in this area and therefore contributes to reduced noise levels.

At the end 94 adjacent to the fan the cooling fibs are closed by the edge 24 of the cover 23, whereas on the opposite side 95 they can have openings 25, as shown in FIG. 2. However, the air outlet can also take place in the downwards direction, in that also the side 95 of the cooling ribs is covered and in an area 25a indicated by dot-dash lines in FIG. 14 is provided a lower opening of the cover 23.

FIG. 13 shows that adjacent to the reinforced outer cooling rib 18a is formed an area 28a within the cover 23 extending along the cooling body and in which are located the control electronics 20, 21. The connections take place by means of a mounting plate or circuit board 16, which extends over and beyond the underside of the outer rib 18a and can be fixed to the latter. However, this is not usually necessary, because its electronically connected power control elements 21 are directly laterally screwed to the outer rib 18a, so that the heat thereof can be dissipated by contact heat transfer.

The other, not significantly heating electronic components 20 can be located on the mounting plate spaced from said outer rib 18 and this plate runs parallel to the cooking surface and the bottom of the cover 23.

Thus, the air can flow unimpeded through the cooling channels and the heat is conveyed away by conduction in the cooling ribs and from there through the cooling air flow. It is possible to ventilate the area 28a by means of passages in the outer rib 18a.

FIG. 15 shows a combination component, in which two conventional radiant heating bodies 96 are located within the cover 23, which can form a lower cover for the hob. Alongside the same, there are two induction cookers 32, whose cooling body is positioned in such a way that the area 28a containing the electronics passes on the side remote from the radiant cooking units.

FIGS. 13 to 15 show an arrangement of the fan 37 in the vicinity of a narrow side of the cooling body. A uniform flow distribution can also be obtained if the fan is located in the central area and correspondingly there is a flow through the cooling ribs to either side, i.e. air outlets are located at both ends of the cooling body. As in FIG. 14, the construction of the area 93, e.g. by an eccentric arrangement of the fan, is dependent on the rotation direction of the fan. The latter preferably rotates in such a way that as a result of the angular momentum of flow it is mainly against the outer rib 18a that flow takes place. In the case of a different rotation direction or another arrangement, e.g. as described hereinbefore, the area can be differently designed or the eccentricity can be modified.

Induction coil

The induction generating or producing means 14 comprise an induction coil 30 in the form of a flat, disk-like or circular plate, magnetic yoke means 31 positioned below it and a thermal insulation 32 on the side facing the plate and in the vicinity of which can be provided a shield 33.

Figure 12:
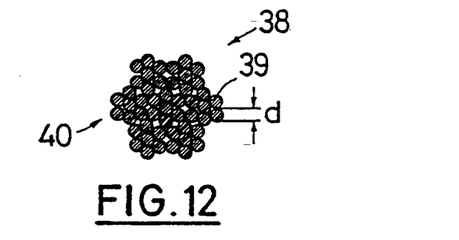
FIG. 12 A cross-section through a strand from which the induction coil is formed.

The induction coil 30 contains strands 38 wound in helical and/or spiral manner and which are constituted by single conductors (cf. FIG. 12). The strands 38 are formed from several, preferably five to nine, and in the present case seven, elements 40, which are twisted together and in turn contain between five and nine, and in the present case seven twisted together single wires. The individual conductors are electrically insulated against one another in conventional manner, e.g. by a heat-resistant varnish coating, The copper single conductors 39 have a diameter d between 0.1 and 0.4 preferably 0.2 mm. This value applies to the presently preferred frequency of the current supplied to the induction coil of between 20 and 30 kHz, preferably approximately 25 kHz. For other frequencies it is possible to determine a basic value D of the single conductor diameter, according to the following formula:

$$D = 1/\sqrt{\Pi * \kappa * f * \mu}$$

in which D is determined in meters. The electrical conductivity k of the single conductor material is given in A/V*m, its permeability u in V*s/A*m and the frequency f in 1/s. The preferred wire thickness d is between a ¼ and ¾ of the basic value D calculated according to this formula. It has surprisingly been found that with such small single conductor diameters the power dissipation in the induction coil 30 can be significantly reduced.

On the basis of all existing findings and which have also been proved by theoretical calculations, the coil losses should decrease on reducing the diameter d to a value the same as the basic value D according to the above formula, but should then scarcely undergo any reduction. The theoretical findings considered to be proven up to now are based on the skin effect of a single conductor and determine for the aforementioned diameter an optimum quantity, because then there is a uniform flow through the total diameter despite the current displacement towards the surface. The basic value D corresponds to the penetration depth of the current in a conductor surface and due to the circular wire shape there is a simultaneous penetration from all sides and therefore a uniform current coverage over the cross-section. This theoretically based consideration has been surprisingly disproved by tests. It would in fact be preferably to have a diameter below 0.2 mm, i.e. smaller than half the basic value D, but the diameter reduction is limited by the mechanical working possibilities.

Tests have shown that the losses by eddy currents and ohmic losses in the single conductors due to the induction produced by the coil in the case of the wire thicknesses used up to now (basic value D of 0.4 mm at a frequency of 25 kHz) were 70 to 100 W, whereas they are halved in the case of a coil having the sane power and a wire diameter d of 0.2 mm and are only roughly 40 W. Therefore the coil heating is much lower and, apart from not inconsiderable energy savings, it would be possible to eliminate otherwise occurring problems connected with coil insulation and heat dissipation from the coil.

Yoke means

The magnetic yoke means 31 formed from ferrite segments is also placed below the coil in the form of a flat, circular layer with a central opening 35. The magnetic field formed on the underside of the induction coil is closed with limited magnetic resistance, but high electrical resistant, so that also there the eddy current losses remain low. No significant induction field is formed on the underside of the induction generating means 14. The magnetic yoke means 31 also form a heat conducting bridge between the induction coil 30 and the cooling body on which they engage, so that the coil loss heat is immediately dissipated into the cooling body.

Thermal insulation

The thermal insulation 32 is in the form of a plate with a central opening 35 between the latter and the glass ceramic plate 12 and which covers the induction coil 30. It is made from a very good heat protecting and preferably also electrically insulating material, e.g. a pyrogenic silica aerogel, which is compressed or molded into a plate.

It would appear to be unusual to shield the actual heating element, namely the induction coil, in thermal manner with respect to the heat-absorbing cooking vessel. Even if account is taken of the fact that the energy transmission takes place by induction are not by heat transfer, it would be thought that at least for the dissipation of the loss heat into the induction coil a very good heat closure to the load, i.e. the cooking vessel 13 would be advantageous. However, it has been found that the induction coil, particularly in the case of the aforementioned low-loss coil construction, generates so little heat that through a heat bridge to the load heat is removed from rather than supplied to the latter. As a result of the heat protection the induction coil is kept at a lower temperature level, which is advantageous for coil design and insulation. There is also an efficiency improvement because the heat of the cooking vessel 13 is not carried off downwards through the glass ceramic plate. The thermal insulation 32 advantageously simultaneously forms an electrical insulation against the glass ceramic plate 12, which becomes electrically conductive at elevated temperatures.

Plate monitoring

In the vicinity of the central opening 35, which passes through the insulation 32, the induction coil 30 and the yoke means 31, is provided an optical sensor 36, which senses the radiation from the glass ceramic plate. Therefore an indirect measurement of the cooking vessel temperature, which could become harmful to the glass ceramic plate can be made by means of a contact-free measurement, which would be difficult to perform in the magnetic field of an induction cooking point. Therefore, it is a question of a measurement of the cause of the thermal hazard to the glass ceramic plate, because the latter is only heated by the cooking vessel. The glass ceramic largely transmits the radiation and cannot therefore be measured in contact-free manner. However, in the case of other plate materials the latter could constitute the radiation source.

The optical sensor is an infrared detector, whose spectral sensitivity is in the infrared range. With increasing cooking vessel temperature there is a rise in the maximum of the frequency of the irradiated photons according to Wien's displacement law. As from a predetermined temperature the energy of the irradiated photons corresponds to the spectral sensitivity of the IR detector, so that an evaluatable signal is formed, which is then used for disconnecting or reducing the power of the induction heating system. For this purpose, the optical sensors 36 of each induction cooker act by means of comparators 41 on a microcomputer 42 (FIG. 4), one being provided in each case for the control and regulation of an induction cooker. It is adjustable by means of the setting member with the knob 26 to a specific temperature or power stage. The optical sensors 36 can be silicon diodes.

Alternatively, precision resistors could be applied to the plate, e.g. between the latter and the insulation in the coil area, if said resistors are not or are only slightly influenced by the magnetic field and any influencing can be compensated on a circuitry basis or in the measuring program.

Shield

Figure 6:
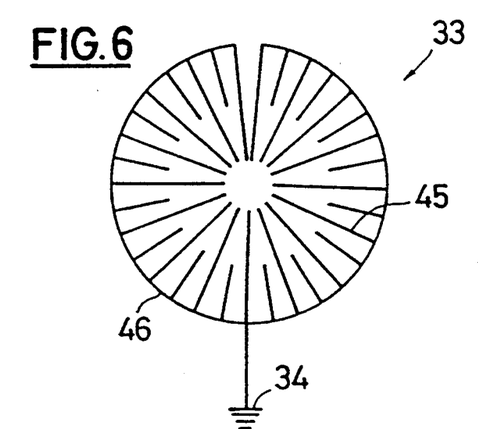
FIGS. 6 & 7 Diagrammatic representations of a shield.
Figure 7:
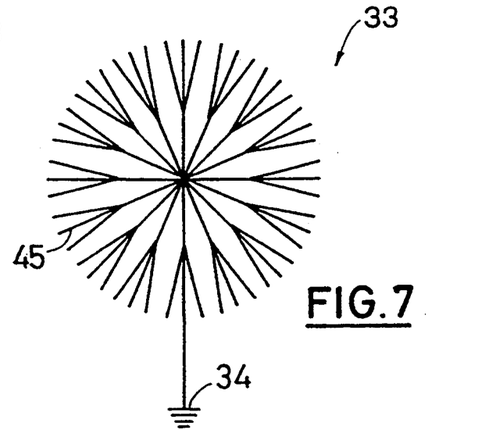

The shield 33 is provided between the induction coil 30 and the glass ceramic plate 12. It can be located on or is advantageously embedded in the top or bottom of the thermal insulation 32. The shield, for example, comprises a wire or strip structure shown in FIGS. 4 and 6 and which is constructed in low eddy different manner. This means that the thickness of the individual structural elements 45 (wires, strips, etc.) is smaller than the current penetration depth at the frequency used and also the structures are not electrically closed. Thus, in FIG. 6 there is an open ring conductor 46 with inwardly projecting branches 45, which are of varying length, so that the entire surface is uniformly covered. The ring 46 is connected to an grinding device 34, e.g. by connection to the grounded sheet metal tray 23 of the component 11 (FIG. 1).

Without any significant losses occurring, as a result of the said shield, the electrical field formed around the induction coil is shielded in the upwards direction and consequently so is the stray electrical radiation. In addition, the discharge currents from the cooking vessel can be reduced. The shield could also be formed by an grounded resistance material layer. It is important that the material is not magnetic and, for avoiding eddy current losses, has a relatively high electrical resistance compared with metallic conductors.

Basic circuit

Figure 4:
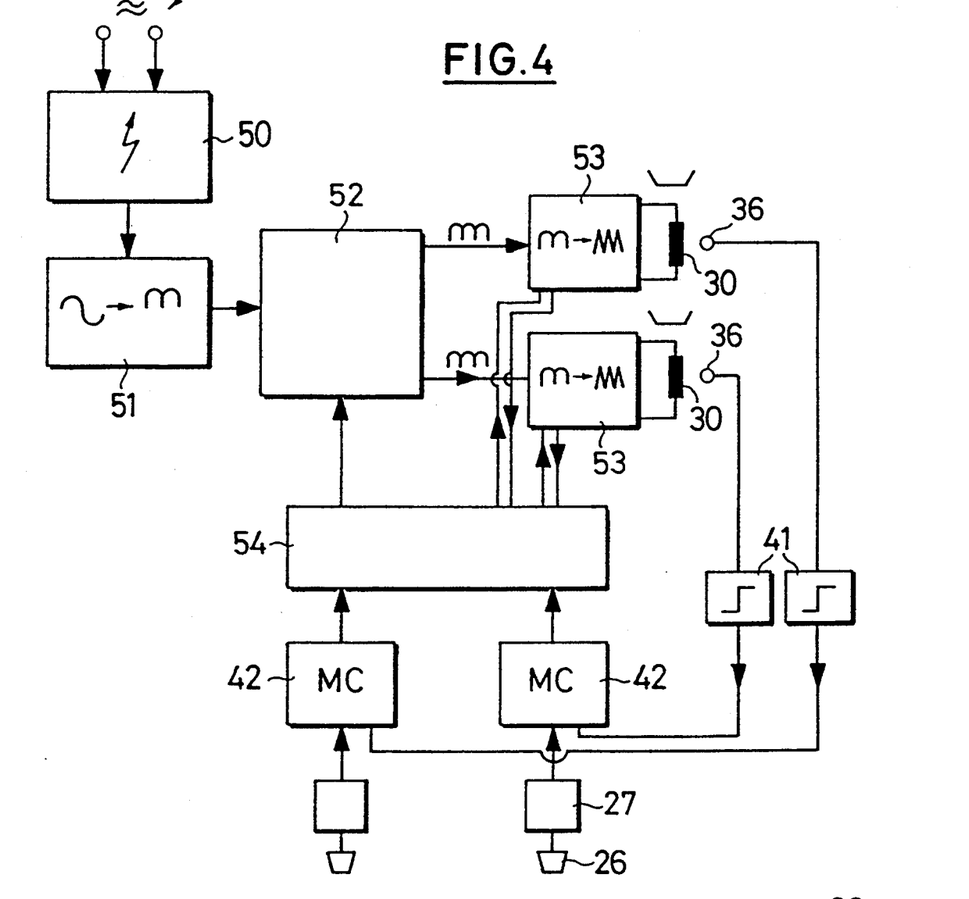
FIG. 4 A block circuit diagram of the control and power supply of two inaction coils.
Figure 5:
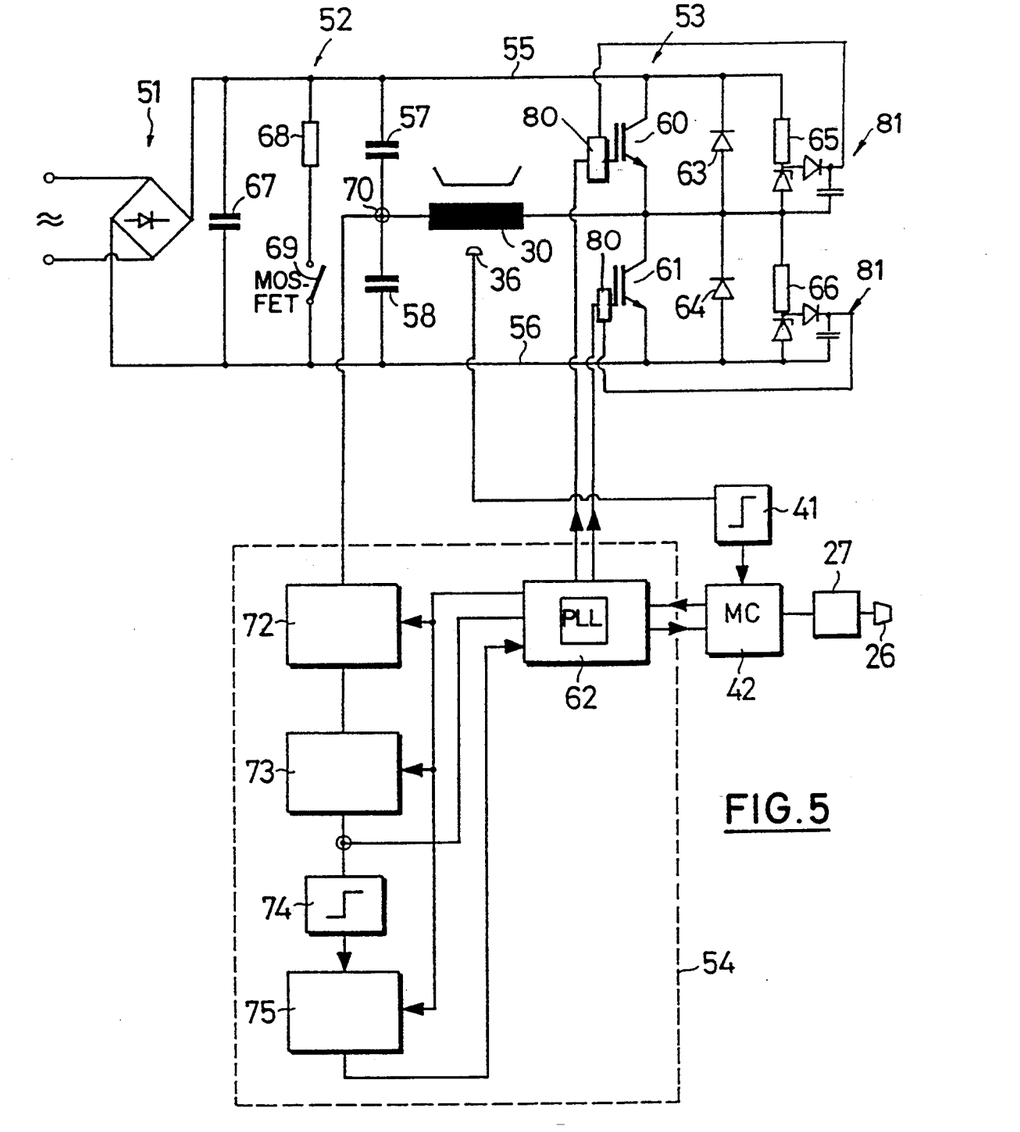
FIG. 5 A part detailed diagram for the operation of an induction coil.

FIG. 4 is a block circuit diagram and FIG. 5 a more detailed view relative to the power supply, regulation and control of the induction coils 30. FIG. 4 shows that the alternating current from the power supply 22 is supplied across a radio suppression means 50 and rectification means 51 to a common intermediate circuit 52, from where the supply takes place for the two inverters 53, which could also be referred to as high frequency generators, for each induction coil 30. The intermediate circuit and inverters are controlled by a control means 54, which in turn receives signals from the microcomputers (MC) 42.

FIG. 5 shows the circuit of an induction coil 30 in greater detail, in which the control, inverters 53 and induction coil 30 of a second cooker, which is also connected to the intermediate circuit 52, are not shown so as not to overburden the representation. Reference should be made to FIG. 5 for circuit details.

Each induction coil 30 is located in a resonant circuit with a half-bridge circuit, i.e. there are two branches 55, 56, in each of which there is a capacitor 57, 58 and an electronic switch 60, 61. They can be IGBT components, i.e. electronic semiconductor components incorporating several transistor functions and which are controlled by the control means 62 and can switch extremely rapidly. A free-wheeling diode 63, 64 and a resistor 65, 66 is in each case connected in parallel to said power switches 60, 61. These elements form the inverters 53 constructed as a resonant circuit, upstream of which is connected the intermediate circuit 52 and the rectifying means 51. A rectifier bridge produces a pulsating d.c. voltage, i.e. in which by rectifying the mains alternating current sinusoidal half-waves of in each case the sane polarity are combined. The outputs of the rectifier bridge 51 are applied to the two branches 55, 56. In the intermediate circuit there is a common capacitor 67 between the two branches and a resistor 68 switched by an electronic switch 69, which can be a MOS-FET, which in conjunction with the resistor ensures that there are no clicks when switching on the inverter and it discharges the intermediate circuit.

In the control or driving path to the switches 60, 61 is in each case provided a driving unit 80, which contains an isolation between the low voltage part 54 and the power side, e.g. by optical couplers. Moreover, it supplies the switches with the control energy. The latter is supplied by means of supply units 81, which are located in the branches of the resistors 65, 66 and which in each case contain a Zener diode 82, a diode 83 and a capacitor 84. The Zener diode limits the voltage to the control voltage necessary for the switches 60, 61 and the diode and capacitor serve as a rectifying means.

This leads to a simple "mains device" for the switch driving energy, which obtains its energy from the resistor branch, i.e. from an energy source which is in any case provided. Therefore the resistors produce less loss energy and in spite of this the other conditions are not impaired, e.g. the current value at 70.

The represented resonant circuit in symmetrical circuitry could be replaced by one having asymmetrical circuitry, in which in place of the two resonant circuit capacitors 57, 58 only one is provided. The resonant circuit only then takes energy from the mains half-side. However, this simpler circuitry could be advantageous in cases where precise radio suppression values do not have to be respected.

At a tapping point 70 between the induction coil 30 and the capacitors 57, 58 of the resonant circuit is connected a switching control 71 for the inverter 53, which contains a scruple and hold element 72, a limit value memory 73, a comparator 74 and an on-off memory 75. This switching control is provided in order to immediately disconnect the induction heating system if no power decrease occurs, e.g. if the cooker vessel 13 is removed from the cooking and is only to be switched on again when a cooking vessel is present. For this purpose, in relatively short time intervals, a check is made to detect such a presence and this takes place by measurement of the damping of the induction coil 30.

Power control

The switching on of the resonant circuit takes place in the zero passage of the mains voltage in accordance with a predetermined diagram, which is given by the microcomputer 42 and which will be explained hereinafter. The resonant circuit is controlled by means of the electronic power switches 60, 61, namely from the control 62. Prior to each half-wave of the generated high frequency voltage of approximately 25 kHz, in the zero passage there is a switching over between the said switches 60, 61. Thus, a completely freely oscillating inverter or inverted rectifier 53 is obtained, which has low switching losses. As will be explained, no phase angle control is used for power setting or regulating purposes. The frequency is not constant and can be adjusted in accordance with the saturation effects by frequency modulation. Therefore, there is no need for the overdimensioning of the power switches 60, 61 and there is a limited harmonic generation.

Power setting takes place by means of an oscillation packet control. In normal operation the inverter is always switched on for a full mains half-wave.

The basis for the power setting is that different power stages are determined by switch-on patterns, which consist of a combination of identical or different, intrinsically basic patterns of wave packets. Mains repercussions are minimized by the complete symmetry.

Figure 8A:
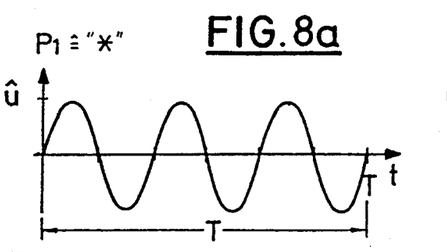
FIGS. 8a to 8d "Current over time" representations of different basic pulse patterns.
Figure 8B:
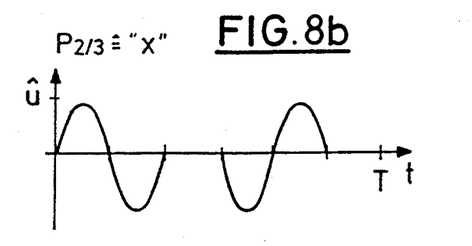
Figure 8C:
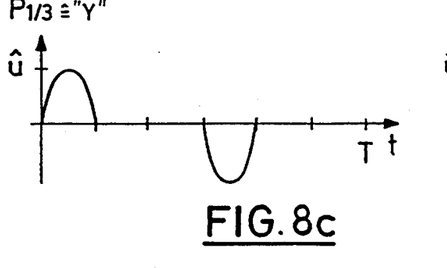
Figure 8D:
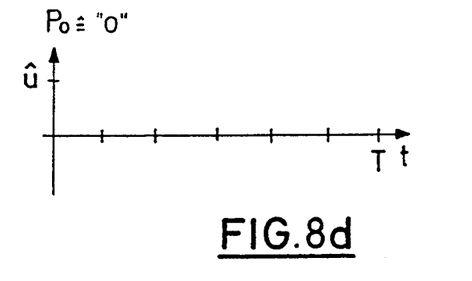
Figure 9:
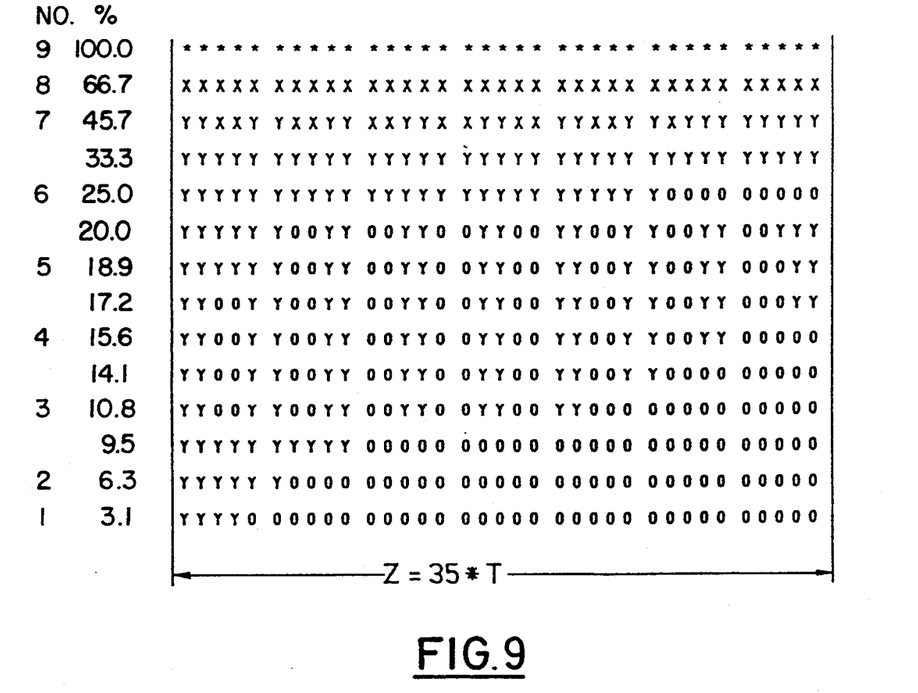
FIG. 9 A table representation of the individual power stages of basic pule patterns.

FIGS. 8 and 9 show an example of a pattern occupancy plan for such an oscillation packet control. A total time interval Z of 2.1 seconds is subdivided into 35 partial intervals T of in each case 60 milliseconds, i.e. six mains half-waves at a frequency of 50 Hz. There are in a four basic patterns of partial intervals T, shown in FIGS. 8 a) to d) as "voltage over time" diagrams. FIG. 8 a) shows a partial interval T with the designation * in which all six mains half-waves are present, i.e. it is a "full per" interval. FIG. 8 b) shows a partial interval T with the designation X in which in all four mains half-waves are so distributed that in all there is a symmetrical distribution. Compared with the "full power" pattern according to FIG. 8 a), the third and sixth mains half-waves are absent (in each case a positive and a negative half-wave), so that this partial interval X has a ⅔ capacity. FIG. 8 c) contains only two mains half-waves, namely the first positive and the fourth negative, so that once again there is a symmetrical distribution. The partial interval T with the designation Y consequently has a ⅓ power. FIG. 8 d) shows the zero power, i.e. during this partial power interval 0 no power is provided.

FIG. 9 shows the occupancy plans using the 35 partial intervals T, which together form the time interval Z of 2.1 seconds. In exemplified manner there are different power stages, e.g. corresponding to the toggle position of the knob 44 and with which are associated the different combinations of bask patterns in accordance with FIG. 8, in each case arranged in series. The following power release percentages reveal that in this way the power characteristic in the case of a power-controlled induction cooker can be adapted at random to the practical requirements. Thus, e.g. the power in the lower setting stages can be regulated much more finely than in the upper stages, which is in accordance with practical requirements. As each basic pattern Y according to FIG. 8 c) only corresponds to less than 1% power within the time Z, the power can be adapted on a percentage basis. It is also possible to obtain completely irregular or non-constant paths, if this is appropriate. Nevertheless, switching in the voltage zero passage is ensured.

FIG. 8 shows positive and negative mains half-waves, as occur upstream of the rectifying means, to demonstrate the freedom from repercussions on the mains. In the resonant circuit there are mains half-waves in the form of rectified alternating current.

In the time interval Z, which is 2.1 seconds in the illustrated example, but can be of random length and subdivided into random partial intervals T, the basic patterns are randomly mixed controlled by the microcomputer and in this way produce a mains-side, d.c.-free control or regulation in relatively short pulses, but in each case containing a complete mains half-wave. The setting by means of the setting elements 43, as shown in FIG. 9, can be purely power-dependent, but there can also be influences on the part of temperature sensors or the like on the microcomputer, so that a control loop is obtained.

The start of the resonant circuit for producing the high frequency supplying the induction coil 30 commences in the zero passage of the mains voltage and amplitude and frequency in the resonant circuit change with the rise and fall of the current and voltage over the individual mains half-waves. Thus, at the start of each half-wave the frequency is higher and decreases in the vicinity of its maximum, because the inverter freely oscillates. Moreover, the frequency not only changes with current, but also with the pot material, because, for example, the inductance is not constant due to magnetic saturation in the pot bottom. If the inductance of the overall arrangement is lower, a higher frequency is obtained. This arrangement also has advantages in connection with radio suppression, because broad-band interference sources can be more easily suppressed. In addition, less harmonics are produced, because no phase gating is required.

Pot detection

The pot detection shown in FIG. 5 and which also protects the environment against excessive induction fields and provides a self-protection of the inverter, functions as follows. If with the cooker switched on the cooking vessel is removed therefrom, there is a pronounced rise in the current in the resonant circuit, because the damping decreases. The current in the inverter is tapped at 70 and detected by the sample and hold element 72. If it exceeds the limit stored in the limit value memory 73, then the inverter is disconnected by means of the control 62, in that the power switches 60, 61 are closed or not opened and this can also take place within a mains half-wave. The energy then present in the resonant circuit is returned via the free-wheeling diodes 63, 64 into the intermediate circuit 52. Therefore the disconnection takes place as a function of the current in the resonant circuit in an extremely rapid and loss-free manner.

Figure 10:
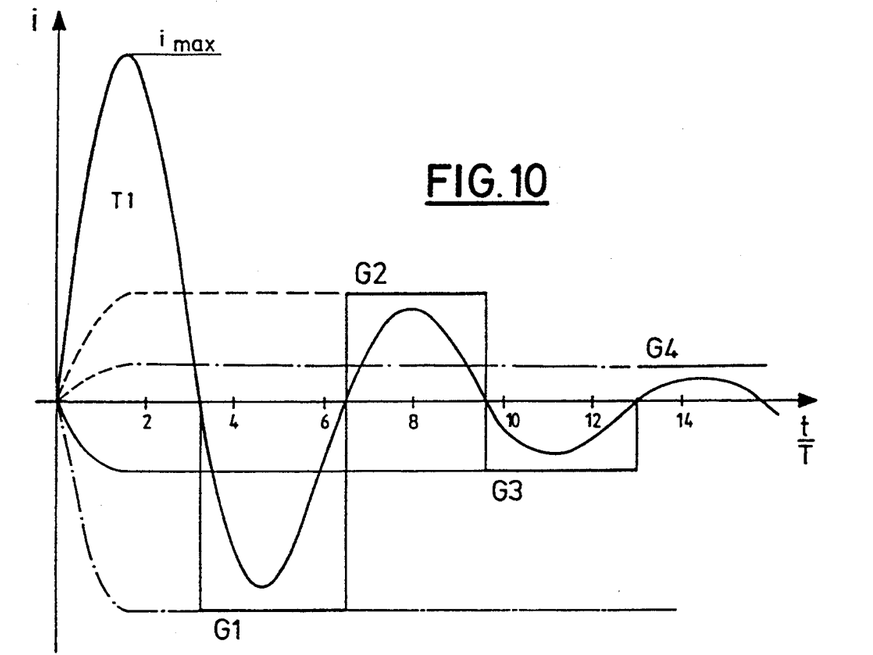
FIG. 10 An explanatory diagram of a current/time pattern.

Despite the switched on cooker no power is released until a suitable cooking vessel is again placed thereon. This on-check takes place at the start of each time interval Z (e.g. 2.1 seconds). The testing process takes place as follows. In the control 62 there is a phase locked loop or PLL supplying the control clock frequency for the power switches 60, 61. During the operation of the resonant circuit it sets itself to the frequency of the main resonant circuit and alternately switches over the power switches 60, 61. Under no-load conditions, i.e. during the testing phase, the phase locked loop on excitation by the microcomputer and closure of one of the two switches 60 or 61 releases a semi-oscillation. Previously, by means of the resistors, 65, 66, the tapping point 70 was charged to a specific voltage and therefore a certain energy was present in the resonant circuit. On switching on one of the power switches current flows for a high frequency halfwave. The sample and hold element, e.g. a peak value detector which also contains a current converter in order to convert the currents flowing into measurement currents, measures the current during this preoscillation and stores the result and corresponds to the value $i_{max}$ in FIG. 10. In the resonant circuit the amplitude decays in accordance with the energy consumption through damping in accordance with a specific function (corresponding to an e-function). If this decay takes place too slowly, the damping is too low and power switch-on conditions do not exist. This is, for example, shown in FIG. 10, where a decaying oscillation is shown and the Limit values G1, G2, G3 and G4 give values which could be stored in the limit value memory 73. If they are exceeded, this means "no adequate damping" and a signal "no switch-on" is given to the microcomputer.

Thus, the pot detection operates according to the damping measurement principle, testing only taking place with half the inverter, so that the power resonant circuit does not start and for this purpose it would be necessary to have an alternate switching on of the two power switches 60, 61.

In the circuit embodiment according to FIGS. 4 and 5, the testing process takes place in such a way that from the first oscillation on switching on one of the power transistors 60 or 61 the current value is measured for a very short time E, for example, 20 microseconds (roughly a half-oscillation in the idler frequency), is established by the sample and hold element and from this in the limit value memory 73 the following limit values, e.g. G1 to G5 are derived. Under the control of the microcomputer the phase locked loop PLL then introduces intervals P of the same order of magnitude and then switches on the power transistor again. From the current drop in the next oscillation (see FIG. 11), by comparison with the limit values by means of the comparator 74, it is possible to establish whether the current exceeds these limits (here G2 and G3). The result of this check is buffer stored in the memory 75.

Figure 11:
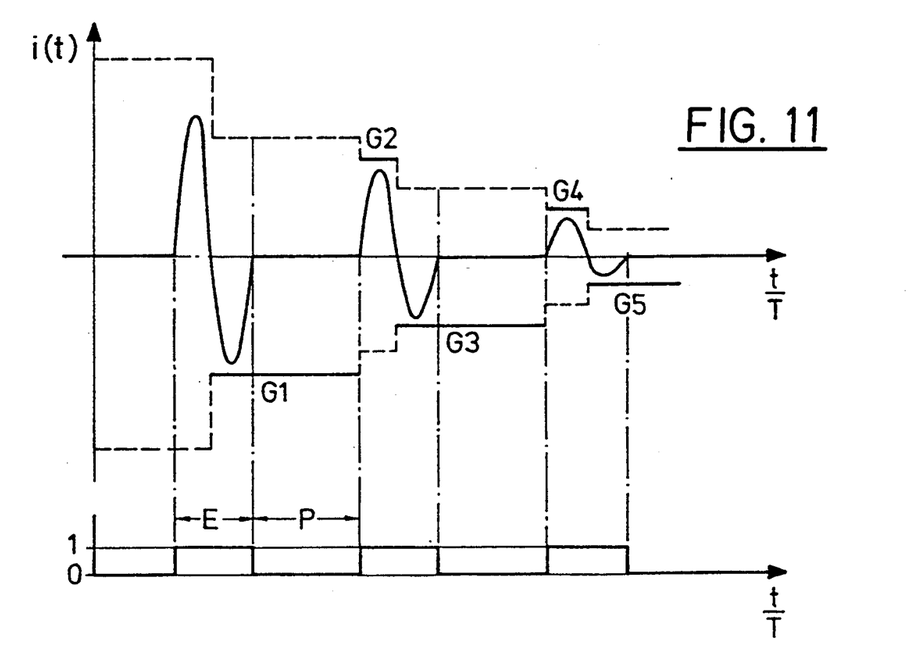
FIGS. 11 The current/time pattern and the associated on-periods of a pot detection testing cycle.

There is then a second switching on when the limits G4 and G5 are used for the comparison. This second measurement takes place for safety reasons, so as to avoid falsification by a pronounced frequency swing, e.g. in the case of an aluminum or copper article in place of a cooking vessel. If this measurement also reveals no exceeding of the limit values, then the damping is adequate and there is a power switch-on of the resonant circuit by the control 62. As the entire measurement only takes microseconds, the energy decayed in the resonant circuit, because it could not be replaced in this time by the high-ohmic voltage dividers 65, 66 connected in parallel to the power switches 60, 61. Up to the next test cycle at the start of the next time interval Z (after 2.1 seconds), the resonant circuit is supplied by said voltage dividers with the corresponding test voltage and a new test can begin, if any exceeding of the limit values is established and therefore "too little damping" is detected and the resonant circuit was not switched in power operation.

Testing can take place with a very low testing current, e.g. 1/10 of the rated current in the case of power operation. Since also as a result of the very short on times of e.g. 20 microseconds within the test cycle of 2 seconds the resonant circuit is only in testing operation for approximately 1/100000 of the total time, the total power release during testing is an insignificant fraction of the total power of the cooker and can be ignored from the energy standpoint and also with respect to the influencing of the environment. It is approximately 1 to mW in the case of a 2,000 W cooker.

As a result of this pot detection by means of checking the possible power decrease (damping), there is a very reliable, quick-acting and test energy-low measurement. In place of current measurement in the resonant circuit, it is e.g. possible to use a voltage measurement on the resonant circuit capacitor, in order, by measuring the decay of the voltage emplitude, to carry cut a comparison with the limit values determined on the basis of the initial measurement. Testing only takes place with half the inverter, so that the power resonant circuit does not start during the testing phase. If in the two successive measurements (second and third switching on of the PLL) both the values stored in the memory are found to be adequate for damping (limit values not exceeded), in the control 72 and accompanied by the timing of the phase locked loop PLLL, the resonant circuit is put into operation with full power by the alternate switching on of the power switches 60, 61. The power release then takes place in accordance with the power diagram explained relative to FIGS. 8 and 9 until either the cooker is switched off by means of the setting element 43, or by removing the pot the self-protection cones into effect and the power is disconnected, so that it once again passes into the testing phase.

We claim:

1. An induction based cooking system for cooking hobs having a plate on which cooking utensils can be placed comprising:
   a heating unit adapted for positioning below the plate, the unit including, as an integrally mountable element, a flat housing containing:
   at least one flat induction coil means; high frequency generation means including electronic power switch means for energizing the induction coil means;
   electronic control means for controlling the high frequency generating means;
   a heat sink provided with cooling ribs on at least one side; and a fan for blowing cooling air alongside the cooling ribs;

wherein the heat sink is a support for the induction coil means, said induction coil means being located on the heat sink and in heat conductive connection therewith; and the electronic power switch means being mounted in heat conductive connection with the heat sink.

2. A cooking system according to claim 1, further comprising a magnetic yoke means and wherein the induction coil is constructed as a flat, disk-like coil, which on its side remote from the plate is adjacent to the magnetic yoke means comprising a segmented ferrite layer.

3. A cooking system according to claim 1, wherein the cooling air follows along channels formed between the cooling ribs.

4. A cooking system according to claim 3, wherein several induction coil means are arranged along a horizontal housing axis and the cooling ribs extend substantially along the axis.

5. A cooking system according to claim 1, wherein the power switch means are located in the area between a plurality of said induction coil means.

6. A cooking system according to claim 1, further including at least one mounting plate and wherein the electronic control means are located on said mounting plate, which is located on the side of the heat sink remote from the plate.

7. A cooking system according to claim 6, wherein the mounting plate is arranged alongside the heat sink and at least partly defines channels formed alongside and between the cooling ribs.

8. A cooking system according to claim 1, wherein a thermal insulation is provided between the plate and the induction coil means.

9. A cooking system according to claim 1, wherein each unit contains at least two high frequency generators, corresponding to the number of induction coil means, but containing a common intermediate circuit including rectification and interference suppression means.

10. A cooking system according to claim 1, comprising an optical measuring device for temperature measurement of the plate.

11. A cooking system according to claim 10, wherein the measuring device operates in contact-free manner and has a sensor acting in the vicinity of the magnetic field of an induction coil means.

12. A cooking system according to claim 11, wherein the sensor has a specific spectral sensitivity range, being in the infrared radiation range.

13. A cooking system according to claim 10, wherein the measuring device is provided for protecting the plate against overheating and acts to reduce power supplied to the induction coil means.

14. A cooking system according to claim 1, wherein the fan is a radial fan located in a recess of the heat sink, said fan having a fan wheel and central suction from below said fan being positioned close to one end of the heat sink.

15. A cooking system according to claim 14, wherein between the fan wheel and the outer boundary of the recess is formed an area, the cross-section of which increasing in the flow direction of air passing out of the fan wheel and flowing into the cooling channels.

16. A cooking system according to claim 15, wherein the fan is positioned eccentrically in the recess, which recess is substantially circular.

17. A cooking system according to claim 1, wherein the electronic control means are located in an area located alongside the heat sink, one wall of said control means being formed by lateral rib of the heat sink, power components being thermally connected to the lateral rib and whose bottom is formed by a mounting plate having electronic connections of the electronic control means.

18. A cooking system according to claim 17, wherein openings for ventilating the area are provided in the lateral rib.

19. A cooking system according to claim 1, wherein the control means are connected to a control element for manually controlling and setting of power conditions of the cooking system, which control elements are external to the unit.

20. An induction based cooking system for cooking hobs having a plate on which cooking utensils can be placed, comprising a heating unit adapted for positioning below the plate, the unit including a flat housing containing flat induction coil means, a heat sink supporting the induction coil means and being in heat conductive connection therewith on the side of the induction coil means opposite to the plate, an insulating material layer being positioned between the induction coil means and the plate, filling a gap therebetween.

21. A cooking system according to claim 20, wherein the magnetic yoke means including segmented ferrite layer is interposed between the induction coil means and the heat sink.

22. The induction based cooking system according to claim 20, there is no insulation material on the side of the coil means opposite the plate.

* * * * *